UNITED STATES PATENT OFFICE.

FRITZ WEINBERG, OF NEW YORK, N. Y., ASSIGNOR OF TWO-THIRDS TO EMILE BERLINER, OF WASHINGTON, DISTRICT OF COLUMBIA.

ELECTROLYTIC CELL.

979,906.
No Drawing.

Specification of Letters Patent. Patented Dec. 27, 1910.
Application filed March 31, 1909. Serial No. 487,085.

*To all whom it may concern:*

Be it known that I, FRITZ WEINBERG, a subject of the Emperor of Germany, residing at New York, in the State of New York, have invented certain new and useful Improvements in Electrolytic Cells, of which the following is a description.

My invention consists in the method of constructing electrodes for electrolytic cells used as rectifiers, lightning arresters, condensers, and the like.

As heretofore formed, aluminum rectifiers are based on the peculiar property of aluminum when used as an electrode in certain electrolytes. In the passage of an alternating current through such cell, at first the efficiency in checking one of the phases of the current is very low, but a gradual change or building up of the aluminum electrode takes place, until a maximum efficiency is reached. Such rectifiers, however, are open to two objections, first, that at first the efficiency is too low for the purpose intended, because the point of maximum efficiency is only reached after the lapse of time necessary to build up the electrode; and secondly, the greatest efficiency of a rectifier constructed by that method is not as great as it ought to be, because the electrolyte itself during the process of building up the aluminum electrode becomes changed, whereas for the highest efficiency, an electrolyte free from aluminum or other electrolytic admixtures or efficiency reducing properties, is desirable.

For the purpose, therefore, of providing a rectifier, condenser or the like, which shall possess at the outset the highest efficiency, and in which there shall be no substantial decrease in the efficiency of the electrolyte, I have devised my improved method of forming the electrode, which is to be used in the electrolytic cell, which method utilizes the principles above stated. In carrying out my method, I give to the aluminum electrode, a preliminary treatment, which consists in immersing said aluminum electrode in a special forming solution, for which I prefer phosphates, preferably sodium phosphate, but ammonia or other phosphates may be employed. This solution forms the electrolyte. An electrode of iron or other suitable material is also inserted in the forming solution, and an alternating current passed through the electrodes. The aluminum electrode will be gradually formed or transformed, or built-up until its maximum efficiency as a phase resister, is reached. The aluminum electrodes thus formed, may be used as the permanent electrode in an electrolytic cell, which is preferably constructed with a second electrode of iron or other suitable material, and an electrolyte preferably of sodium phosphate or ammonia, or other phosphate may be employed. By this preliminary immersion and creation of the aluminum electrode, it will be seen that the electrolyte of the cell in which the formed electrode is placed, will be free from admixtures or efficiency reducing properties, and a cell is produced of greater efficiency. Furthermore, the aluminum electrode having been previously formed, the electrolyte of the cell remains substantially a permanent staple solution, thereby securing the largest efficiency for all times, and the cell may be utilized as a rectifier, lightning arrester, condenser, and the like.

Having thus described my invention, what I claim as new and desire to secure by Letters Patent, is:—

1. The method of constructing an electrode for an electrolytic cell, consisting in the preliminary immersion of an aluminum electrode in a special forming solution which is independent of the electrolyte in which the electrode is to be used, passing an alternating current through the same, until said electrode is formed.

2. The method of constructing an electrode for an electrolytic cell, consisting in the preliminary immersion of an aluminum electrode in a phosphate solution which is independent of the electrolyte in which the electrode is to be used, passing an alternating current through the same until said electrode is formed.

In testimony whereof I affix my signature, in presence of two witnesses.

FRITZ WEINBERG.

Witnesses:
JOHN BAILEY,
RALPH E. BATES.